UNITED STATES PATENT OFFICE.

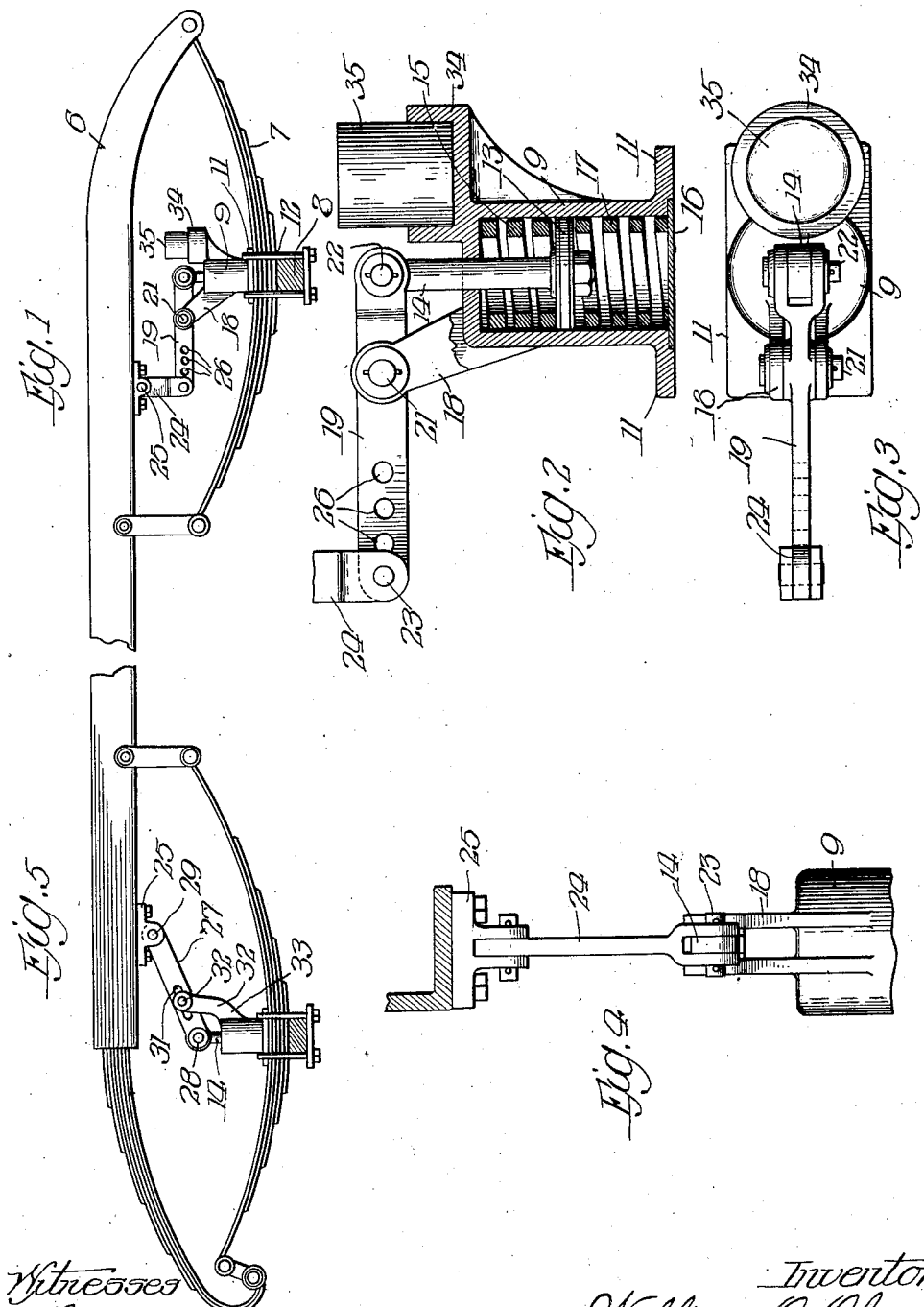

WILLIAM O. OLSON, OF CHICAGO, ILLINOIS.

SHOCK-ABSORBER.

1,097,353.  Specification of Letters Patent.  Patented May 19, 1914.

Application filed April 14, 1913. Serial No. 760,935.

*To all whom it may concern:*

Be it known that I, WILLIAM O. OLSON, a citizen of the United States, and resident of Chicago, in the county of Cook and State of Illinois, have invented certain new and useful Improvements in Shock-Absorbers, of which the following is a specification.

This invention relates to shock absorbers and has more particular reference to shock absorbers such as are adapted for use on automobiles to prevent excessive movement of the vehicle body relatively to the axles.

One of the objects of the present invention is the provision of a shock absorber which will yieldingly resist undue movements of the vehicle body relatively to the axle, which will relieve the springs of excessive stresses and strains and, which will materially increase the riding qualities of the vehicle.

Another object is the provision of a shock absorber which will be adapted to sustain the weight of the vehicle body in case the main springs of the vehicle should break, thereby permitting the vehicle to run without carrying the body directly on the axles.

A further object is the provision of a shock absorber which will be simple in construction, cheap to manufacture, efficient and durable in operation and one which will materially increase the comfort of riding.

Other objects and advantages of the invention will be readily apparent to those skilled in the art as the invention is better understood by reference to the following description when considered in connection with the accompanying drawings.

Referring to the drawings—Figure 1 is a fragmentary view of a portion of an automobile equipped with my invention; Fig. 2 is an enlarged view of my improved shock absorber, certain parts being shown in section; Fig. 3 is a plan view of the structure shown in Fig. 2; Fig. 4 is a fragmentary view looking toward the right at the shock absorber shown in Fig. 1; and Fig. 5 is a view similar to Fig. 1 showing a modified form of my invention.

On the drawings reference character 6 indicates a portion of the chassis of the automobile carried by the usual elliptical spring 7 supported from the axle 8, these parts being of any well known or preferred construction.

My improved shock absorber which is adapted to be positioned between the axle and the vehicle body comprises a cylinder 9 closed at its upper end and open at its lower end, said cylinder being equipped with outwardly projecting flanges 11 over which the clips 12 may be fastened to secure the cylinder upon the axle or spring. Within the cylinder is arranged a plunger 13 carried by a rod 14 projecting through the upper closed end of the cylinder. A compression spring 15 is disposed between the top of the cylinder and one face of the plunger. The open bottom of the cylinder may be closed by a plate 16, or other suitable closure, set in a recess in the bottom of the cylinder and between this plate and the lower face of the plunger is disposed a second compression spring 17. The springs 15 and 17, acting against opposite faces of the plunger 13, normally hold the plunger substantially in the position shown in Fig. 2.

Upon the cylinder and preferably integrally therewith I have formed a bracket 18 which projects upwardly above the cylinder and is preferably forked at its upper end as shown in Fig. 3 to receive a lever 19 which is pivoted in the bracket upon a pin 21. One end of the lever is connected with the upper end of the rod 14 by a pin 22, or other suitable pivotal connection. The outer end of the lever is pivotally connected by a pin 23 with a link 24 which, in turn, is pivotally connected to the upper end in a bracket or bearing 25 fixed to the frame of the machine by bolts or other suitable fastening means.

When the vehicle frame approaches the axle the plunger 13 is moved upwardly in the cylinder against the force of the spring 15 and when the vehicle body moves upwardly the plunger is forced downwardly against the action of the spring. Movement of the plunger, therefore, in either direction from the normal central position is resisted by either the spring 15 or the spring 17 and undue movements of the frame relatively to the axle are, accordingly, precluded. In order to provide for an adjustment of the absorber to vehicle bodies of different weights, or to vehicle springs of different strengths, I have provided the longer arm of the lever 19 with a plurality of holes 26 so that the longer end of the link 24 may be connected with the lever at any one of a plurality of points. It will be manifest that as the pivotal connection between the link 24 and the lever 19 is moved nearer the fulcrum 21 of the lever the plunger 13 will be given a greater movement by the same movement of the vehicle frame and this adjustment may be made whenever necessary to compensate for differences in strength of the vehicle springs.

In the form of my invention shown in Fig. 5 the lever 27 which is connected at 28 with the plunger rod 14 is directly connected at its other end with the bearing member 25 by a pin 29, the link 24 being eliminated from this construction. In order to compensate for movements of the lever 27 and to permit the rod 14 to move in a right line I have provided the lever 27 with an elongated slot 31 which bears on a pin 32 carried by a bracket 33. This slotted bearing permits a sufficient longitudinal movement of the lever 27 to enable the rod 14 to move up and down in a right line.

Under ordinary conditions the spring 15 will carry the weight of the car if the supporting springs 7 should become broken but, in order to obviate any possibility of injury to the mechanism which might be caused by the frame 6 striking the lever 19 or the ears 18, I have provided the casing 9 with an upwardly projecting socket 34 adapted to receive and carry a buffer 35 of rubber or other suitable material. It will be observed from an inspection of the drawings that the top of this buffer extends above the ears 18 and the lever 19 so that if the body of the car should drop by reason of the breakage of the spring 7 or of the spring 15 the weight of the body will be carried by this buffer without injury to the shock absorber.

It is believed that my invention will be readily understood from the foregoing without further description and it will be obvious that should a vehicle spring become broken the weight of the body would be carried by the spring 15 of the absorber without permitting the body to drop upon the axle. This feature is of material importance in that it will enable the user to drive his car with a broken spring without in any way injuring the body or the axles.

While I have shown and described those embodiments of my invention which at present seem to be preferable, it should be understood that the size, shape, proportion and arrangement of the various elements may be changed considerably within the scope of my invention as defined in the following claims.

I claim:

1. A shock absorber comprising a casing adapted to be secured to the axle of an automobile, a plurality of compression springs arranged in said casing, a plunger disposed between said springs and adapted to compress one or the other of said springs upon movement in either direction, a rod connected with said plunger and projecting through an end of the casing, a bracket extending above said casing, a lever pivotally mounted between its ends in said bracket and connected at one end with said rod, and connections between the other end of said lever and the frame of the automobile whereby said lever is actuated to move said plunger against the force of one of said springs upon movement of said frame relatively to the axle.

2. The combination with a vehicle comprising a frame, an axle and a spring connecting said frame and axle, of a casing secured to said axle and positioned between the spring and said frame, a plunger mounted to reciprocate in said casing, compression springs disposed between the ends of said casing and said plunger, a rod secured to said plunger and projecting through the upper end of said casing, a bracket mounted on the casing and projecting upwardly therefrom, a lever pivoted intermediate its ends on said bracket and connected at one end to said rod, and a pivotal connection between the other end of said lever and the vehicle frame whereby movement of the frame relatively to the axle in either direction is resisted by one of said springs.

3. The combination of a casing open at one end, a plunger mounted to reciprocate in said casing, a compression spring disposed between said plunger and the closed end of said casing, a removable plate for closing the other end of the casing, a second compression spring disposed between said plunger and said plate, a bracket projecting upwardly from said casing, a lever pivotally mounted in said bracket, a rod projecting through the upper end of said casing and connecting one end of said lever with said plunger, and means whereby the other end of said lever may be connected to a vehicle body.

4. A shock absorber comprising a casing adapted to be secured to the axle of an automobile, a plurality of compression springs arranged in said casing, a plunger disposed between said springs and adapted to compress one or the other of the springs upon movement in either direction, a rod connected with said plunger and projecting above the casing, a lever pivotally mounted on said casing and connected at one end with said rod, connections between the other end of said lever and the vehicle body, and a buffer carried by said casing and projecting above the upper end of said rod in position to support the body of the vehicle.

5. A shock absorber comprising a cylindrical casing, a plurality of coiled expansion springs disposed therein, a plunger positioned between said springs and adapted to reciprocate longitudinally of the casing, a plunger rod projecting through the top of said casing, a bracket projecting upwardly from one side of said casing, a lever fulcrumed between its ends in said bracket, one end of said lever being connected with said plunger rod, a link adjustably connected to the other end of said lever and adapted to be attached to the frame of a vehicle, and a buffer carried by said casing and projecting above said lever in position to receive and support the vehicle body in the event of breakage of the vehicle spring.

WILLIAM O. OLSON.

Witnesses:
IRA J. WILSON,
FRANKLIN M. WARDEN.

Copies of this patent may be obtained for five cents each, by addressing the "Commissioner of Patents, Washington, D. C."